United States Patent
Tvaruzek et al.

(10) Patent No.: US 9,194,469 B2
(45) Date of Patent: Nov. 24, 2015

(54) BEARING ASSEMBLY FOR ISOLATING AND DAMPING SWASHPLATE VIBRATION

(71) Applicant: SAUER-DANFOSS INC., Ames, IA (US)

(72) Inventors: Jaromir Tvaruzek, Ames, IA (US); Joseph Wright, Ames, IA (US)

(73) Assignee: DANFOSS POWER SOLUTIONS INC., Ames, IA (US)

(*) Notice: Subject to any disclaimer, the term of this patent is extended or adjusted under 35 U.S.C. 154(b) by 0 days.

(21) Appl. No.: 13/973,074

(22) Filed: Aug. 22, 2013

(65) Prior Publication Data

US 2015/0053028 A1 Feb. 26, 2015

(51) Int. Cl.
| | |
|---|---|
| F16C 19/26 | (2006.01) |
| F16C 27/00 | (2006.01) |
| F16H 23/00 | (2006.01) |
| F16C 19/52 | (2006.01) |
| F04B 1/20 | (2006.01) |
| F04B 1/30 | (2006.01) |

(52) U.S. Cl.
CPC .............. *F16H 23/00* (2013.01); *F16C 19/527* (2013.01); *F16C 27/00* (2013.01); *F04B 1/2085* (2013.01); *F04B 1/306* (2013.01); *F16C 2208/36* (2013.01)

(58) Field of Classification Search
CPC ...... F16C 19/26; F16C 19/527; F16C 19/463; F16C 35/00; F16C 41/00; F16C 2208/22; F16C 2208/36; F16C 2208/58; F16C 33/495; F04B 1/2085; F04B 1/306
USPC ............ 384/2, 456, 512, 536, 548, 581, 582, 384/625, 907, 602, 611, 626; 92/12.2
See application file for complete search history.

(56) References Cited

U.S. PATENT DOCUMENTS

| | | | | |
|---|---|---|---|---|
| 4,627,330 | A | * | 12/1986 | Beck, Jr. ..................... 384/576 |
| 5,390,584 | A | | 2/1995 | Fritz et al. |
| 5,630,352 | A | * | 5/1997 | Todd ............................ 92/12.2 |
| 5,816,712 | A | * | 10/1998 | Brown et al. ................ 384/536 |
| 5,868,503 | A | * | 2/1999 | Bade ........................... 384/582 |
| 6,536,953 | B1 | * | 3/2003 | Cope et al. .................. 384/536 |
| 6,809,898 | B1 | * | 10/2004 | Prochazka .................. 384/536 |
| 7,517,156 | B2 | * | 4/2009 | Kazama ...................... 384/569 |
| 7,793,582 | B2 | * | 9/2010 | Becker et al. ............... 92/12.2 |
| 2006/0110082 | A1 | | 5/2006 | Tvaruzek |
| 2007/0012535 | A1 | * | 1/2007 | Matheny ..................... 188/378 |
| 2013/0213214 | A1 | * | 8/2013 | Tvaruzek ....................... 92/13 |

FOREIGN PATENT DOCUMENTS

| | | | | | |
|---|---|---|---|---|---|
| DE | 102008049195 | A1 | * | 6/2010 | ............. F16J 15/32 |
| EP | 2418144 | A1 | * | 2/2012 | |
| JP | 04197057 | A | * | 7/1992 | ............. H02K 5/24 |
| JP | 2004092711 | A | * | 3/2004 | ............. F16C 33/56 |
| KR | 2010054253 | A | * | 5/2010 | ............. F16C 19/00 |
| KR | 2012095711 | A | * | 8/2012 | ............. F16C 25/08 |
| WO | WO 2007002903 | A1 | * | 1/2007 | ............. F16C 27/06 |

* cited by examiner

*Primary Examiner* — Marcus Charles
(74) *Attorney, Agent, or Firm* — Zarley Law Firm, P.L.C.

(57) ABSTRACT

A bearing assembly having a cage that holds a plurality of rollers, an inner race, and an outer race. A layer of viscoelastic material positioned between the inner race and a swashplate and/or the outer race and the housing. Alternatively, the inner race has an elongated groove that receives an O-ring segment and a holder that is fitted over the inner race.

7 Claims, 4 Drawing Sheets

BEARING ASSEMBLY FOR ISOLATING AND DAMPING SWASHPLATE VIBRATION

BACKGROUND OF THE INVENTION

This invention is directed to a bearing assembly and more particularly to a bearing assembly for isolating and damping swashplate vibrations.

Current bearing assemblies are known in the art. Current designs provide a certain axial clearance due to stack up of the transfer mechanism housing (such as a pump or motor housing), cradle bearing, and swashplate tolerances. The axial clearance affects the acceleration of the swashplate.

Journal bearing support of the swashplate offers some vibrational energy isolation and damping, but also include higher friction in the rotational degree of freedom. Tapered or standard roller bearing support provides stable support with low friction, but requires a long distance between the swashplate supports which leads to high loading and bending of the swashplate. This also conflicts with hydrostatic unit design objectives to make the unit as short as possible. Cradle bearing support provides swashplate support at the most loaded areas. They optimize and minimize the maximum load and swashplate bending, but include swashplate vibrations in certain speeds related to modal properties of Kit and swashplate where the mass body vibration energy is transferred into kit and servo springs and back. This also results in higher than desired noise levels.

Needed is an assembly that provides isolation and damping like a journal bearing, stable support like a tapered or standard roller bearing, and a small installation space and support like a cradle bearing.

Therefore, an objective of this invention is to provide a bearing assembly that provides stable support, isolates and dampens vibration, and requires a small space.

A further objective is to provide a bearing assembly that reduces noise levels.

These and other objectives will be apparent to one of ordinary skill in the art based upon the following written description, drawings and claims.

SUMMARY OF THE INVENTION

A bearing assembly having a cage that holds a plurality of rollers, an inner race, and an outer race. A layer of viscoelastic material positioned between the inner race and a swashplate and/or the outer race and the housing.

Alternatively, the inner race has an elongated groove that receives an O-ring segment and a holder that is fitted over the inner race.

DETAILED DESCRIPTION OF THE PREFERRED EMBODIMENTS

Figure 1:
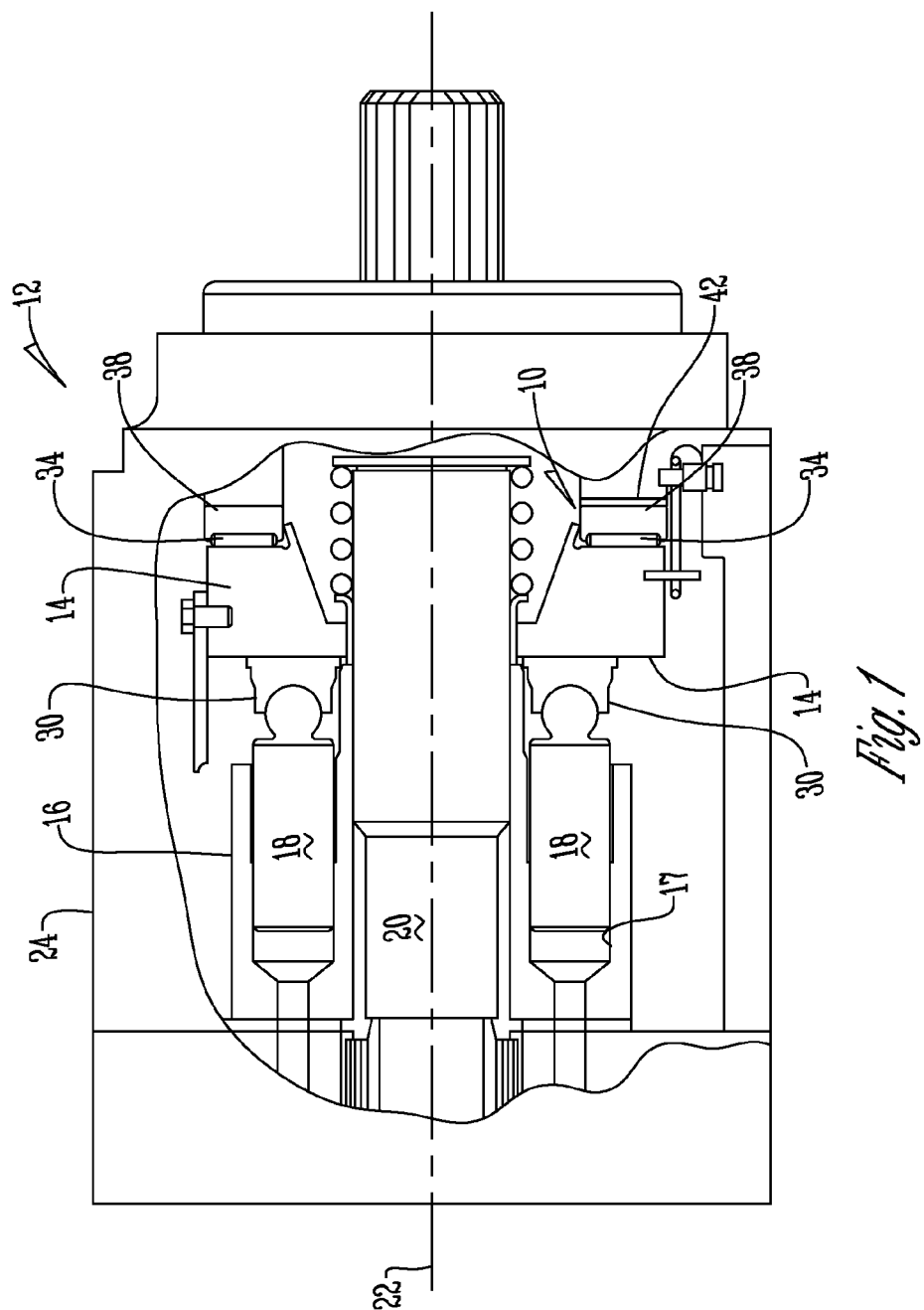
FIG. 1 is a sectional view of a hydraulic unit utilizing a bearing assembly.
Figure 2:
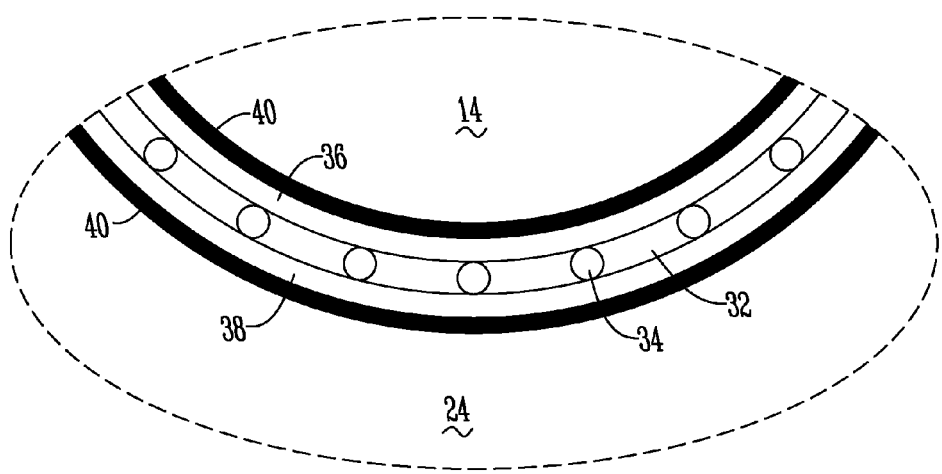
FIG. 2 is a partial side sectional view of a bearing assembly.
Figure 3:
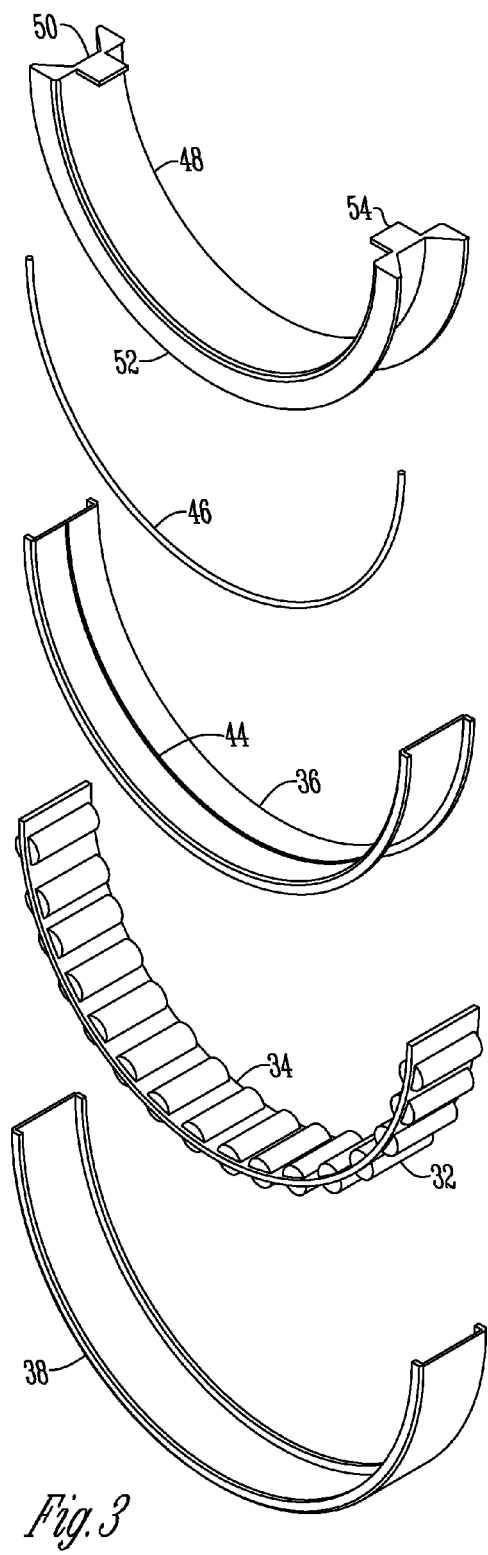
FIG. 3 is an exploded perspective view of a bearing assembly.

Referring to the Figures, a bearing assembly 10 for isolating and damping swashplate vibration is designed for any product with anti-friction roller/ball bearing supports for a swashplate or yoke. For purposes of example only, the assembly 10 is disclosed for use in a variable displacement hydraulic unit 12 that utilizes a cradle swashplate 14. Because tapered and cylindrical rollers offer a cost advantage, where cost is a critical factor, tapered or cylindrical roller bearings would be selected.

The hydraulic unit 12 has a rotatable cylinder block 16 with a plurality of cylinder bores 17 with reciprocating pistons 18 therein. The cylinder block 16 is secured to a shaft 20 and rotates about a central axis 22. Located at one end of the housing 24 is the cradle swashplate 14 which is adapted for tilting or pivotal movement. The swashplate has a planar cam surface 28 engaged by piston slippers 30 so that the tilting movement of the swashplate 14 controls the axial displacement of the pistons 18.

Figure 4:
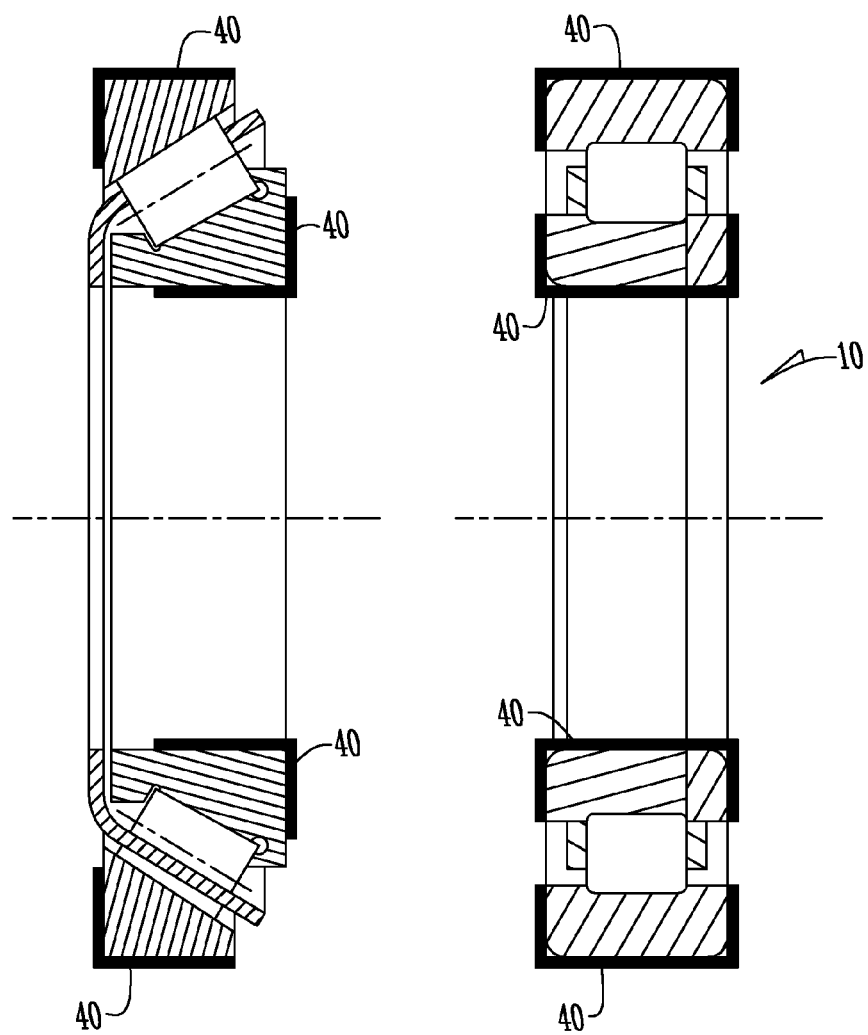
FIG. 4 is a sectional view of a tapered and a cylindrical roller.

The cradle swashplate 14 is mounted on the housing 24 by the cradle bearing assembly 10. The cradle bearing assembly 10 has a cage 32 that holds a plurality of rollers 34. The cage 32 is positioned between an inner race 36 and an outer race 38. Placed between the inner race 36 and the swashplate 14 is a layer 40 of viscoelastic material. In addition to or alternatively, the viscoelastic layer is placed between the outer race 38 and the housing 24. The viscoelastic material can be a lubricant or a polymer film that provides elastic isolation and viscous damping to minimize the vibration energy that is transferred from the vibration source to the housing and the vehicle structure. Examples of materials include, but are not limited to PEEK, polyamide-imide, polyphtalamide, PTFE, acetal, UHMW or the like. FIG. 4 shows application of layer 40 to a tapered and cylindrical roller. Using a layer 40 of hyper-elastic material to fill the gaps between the swashplate 14 and the bearing assembly and the housing keeps the assembly simple and will provide one degree of freedom of the swashplate such that the instability due to twisting vibration mode will be eliminated.

In addition, a layer 42 of hyper-viscelastic (rubber-like) material is placed between the swashplate 14 and the transfer mechanism housing 24 in the pivot axial direction to eliminate clearance causing resonance mode of a three mass-spring system using a servo piston, swashplate and cylinder block. The properties of the hyper-viscelastic material include the ability to handle a whole range of axial clearances in order to provide sufficient force to maintain the swashplate in a stable position and prevent a twisting vibration mode into the cradle bearing assembly 10.

In an alternative embodiment, the inner race 36 of the cradle bearing assembly 10 has an elongated groove 44 that receives a pre-compressed rubber O-ring segment 46. The O-ring segment 46 provides axial clearance elimination.

A holder or cover 48 is fitted over the cage 32, the inner race 36 and the O-ring segment 46. Preferably, the holder 48 has an arcuate cover section 50 with a pair of gripping flanges 52 that extend transversely and outwardly on the convex side of the cover section. The gripping flanges 52 engage the sides of the cage to provide a frictional fit. Also, extending transversely and outwardly on the concave side of the ends of the cover section 50, are end stops 54 for the cage 32 to provide timing corrections at the ends, if needed. Preferably, the holder is made from an engineered plastic material, steel sheet with a plastic cover or the like to reduce the transfer of vibration into the housing 24.

Therefore, a bearing assembly has been disclosed that the very least meets all the stated objectives.

What is claimed is:

1. A bearing assembly for isolating and damping vibration, comprising:

a cradle bearing having a cage with a plurality of rollers, an inner race and an outer race disposed within a housing;

the inner race having an elongated groove that receives an O-ring segment;

a swashplate supported by the cradle bearing and the inner race is positioned between the swashplate and the cage; and a viscoelastic layer positioned between one of the inner race and the swashplate and the outer race and the housing.

2. The bearing assembly of claim 1 wherein the viscoelastic layer includes at least one of the group consisting of PEEK, polyamide-imide, polyphtalamide, PTFE; acetal and UHMW.

3. The bearing assembly of claim 1 wherein a hyper-viscelastic material is placed between the swashplate and the housing.

4. A bearing assembly for isolating and damping vibration, comprising;

a cradle bearing having a cage with a plurality of rollers, an inner race and an outer race disposed within a housing;

a swashplate supported by the cradle bearing and the inner race is positioned between the swashplate and the cage; and a viscoelastic layer positioned between the inner race and the swashplate.

5. The assembly of claim 4 further comprising a viscoelastic layer positioned between the swashplate and the housing.

6. The bearing assembly of claim 4 wherein the viscoelastic layer includes at least one of the group consisting of PEEK, polyamide-imide, polyphtalamide PTFE, acetal and UHMW.

7. The bearing assembly of claim 4 wherein the outer race is arcuate.

\* \* \* \* \*